Patented Sept. 20, 1932

1,878,963

UNITED STATES PATENT OFFICE

RICHARD MICHEL, OF UERDINGEN, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

MANUFACTURE OF CONDENSATION PRODUCTS

No Drawing. Application filed November 23, 1928, Serial No. 321,517, and in Germany December 1, 1927.

The invention relates to the manufacture of condensation products from polynuclear hydrocarbon compounds and olefines.

I have found that valuable condensation products of different nature are obtained by reacting with an olefine upon a polynuclear hydrocarbon compound such as for example a polynuclear aromatic hydrocarbon, or an oxygen-free derivative thereof containing at least one double linkage in a nucleus, in the presence of a catalytically acting substance and of an inert solvent. Under suitable conditions of temperature and pressure which substantially depend on the substances to be condensed with each other and the catalyst used, isocyclic polynuclear hydrocarbon compounds such as naphthalene, methyl naphthalene, ethyl naphthalene, acenaphthene, fluorene anthracene, phenanthrene and the like or their oxygen-free derivatives inasmuch as they contain at least one double linkage in a ring (an aromatic nucleus being considered as containing three double linkages) such as halogenated and/or partially hydrogenated naphthalenes or anthracenes readily undergo the condensation by which according to the operating conditions crystalline or oily alkyl derivatives or higher condensation products of oily or resinous nature are produced.

Among the catalytically acting substances which have been found effective in uniting olefines with polynuclear compounds are inorganic halides particularly anhydrous metallic halides as for example aluminum chloride, aluminum bromide and iron chloride, but other halides such as boron fluoride as well as addition compounds of, say, aluminum halides and olefines, too, have proved efficacious. With either of these catalysts there may be combined also other substances capable of promoting the reaction such as for example benzene hydrocarbons and halogen acids e. g. hydrogen chloride.

The solvent employed in my process has a double function: to facilitate the reaction and to prevent undesired secondary reactions. The yield in condensation product, therefore, is considerably increased by using an inert solvent viz. a solvent which reacts with neither the catalyst nor with the olefine or polynuclear compound present. Such solvents are for example saturated aliphatic hydrocarbons e. g. petroleum ether, petroleum benzene, paraffin oil, or completely hydrogenated aromatic hydrocarbons, e. g. hexahydrobenzene, hexahydrotoluene, decahydronaphthalene and the like.

The conditions of temperature and pressure for carrying out my process may vary within wide limits and depend upon the substances to be combined. Generally the higher homologues of ethylene i. e. propylene, butylene, hexylene etc. and cyclic olefines such as cyclohexene will react more readily than ethylene itself and can be united with the polynuclear hydrocarbon compounds under extremely mild conditions such as at room temperature and/or under atmospheric pressure. Raising temperature and pressure will accelerate the condensation process and, due to more intensified action of the olefines favour the formation of higher condensation products. An upper limit of 300° C. ought not to be exceeded.

For effecting the condensation of olefines and polynuclear hydrocarbon compounds it is not necessary to use the former in a very concentrated state; the reaction may be effected with gaseous mixtures containing olefines such as for example the gaseous mixtures resulting from oil cracking operations, oil gas, and the like. The polynuclear hydrocarbon compounds, too, need not be in a pure state; crude materials and technical mixtures as are obtained in distilling coal tar or from the mother liquors of the refining of crude anthracene have proved quite suitable as starting materials.

The reaction products obtained by the action of olefines upon naphthalene hydrocarbons are described in my U. S. Patent 1,667,214 issued April 24th, 1928 as being alkylated naphthalenes or higher condensation products thereof. In quite an analogous manner the action of olefines upon other polynuclear compounds yields either alkylated derivatives or higher condensation products thereof. The alkylated derivatives are oily or crystalline bodies while the higher condensation products obtained by more intensified action represent highly viscous oils or soft to hard resinous bodies. The latter condensation products as well as the polyalkylated derivatives wherein some of the alky groups contain more than one carbon atom, inasmuch as they are produced from polynuclear hydrocarbon compounds having at least three nuclei e. g. acenaphthene, anthracene, phenanthrene etc. have not been hitherto known in the literature.

My invention is illustrated by the following examples but not restricted thereto. The parts are by weight.

*Example 1*

In an autoclave 128 parts of naphthalene, 4 parts of anhydrous aluminum bromide and 100 parts of decahydronaphthalene are stirred for some 5 hours with ethylene under a pressure of about 20 atmospheres at 80 to 90° C. The commencement is advantageously promoted by passing in a little hydrogen chloride gas. The consumed ethylene is constantly replenished from a container until a total of about 65 parts has been absorbed. After cooling and removing the aluminum chloride by washing with water, distillation is effected.

The first runnings consist of decahydronaphthalene containing a small amount of unchanged naphthalene and then 130 parts of a colorless fraction boiling from 140 to 200° C. at 20 mm. mercury gauge (mono- and diethyl naphthalene) distill over, followed by 55 parts of a fraction boiling from 200 to 250° C. at 20 mm. mercury gauge. The latter is composed of a mixture of polyethylated naphthalenes being highly viscous strongly fluorescent oils. The residue forms a hard resin.

*Example 2*

Propylene gas is introduced into a mixture of 128 parts of naphthalene, 4 parts of aluminum chloride and 150 parts of hexahydrotoluene at a temperature of about 80° C. with stirring. When an increase in weight of about 170 parts is attained, reaction is interrupted. The crude product freed from aluminum chloride and solvent, represent a semisolid mass which is separated by centrifuging into about 80 parts of oily product mainly consisting of mono- and diisopropyl naphthalene and 185 parts of a solid tetraisopropyl naphthalene showing a melting point of 125 to 126° C. after crystallizing it from methyl alcohol.

*Example 3*

Into a mixture of 128 parts of naphthalene, 12 parts of anhydrous aluminum chloride and 1000 parts of hexahydrobenzene, 224 parts of β-butylene are introduced at a temperature of about 20° C. with stirring. The reaction product is poured into ice, the oily layer washed with dilute hydrochloric acid and the hexahydrobenzene distilled off. A viscous oil remains which is purified by distilling it in vacuo. 300 parts of an oil boiling from 186 to 190° C. at 5 mm. (mercury gauge) are obtained. It mainly consists of a tetrabutyl naphthalene and solidifies to a crystalline mass after some time.

*Example 4*

Propylene gas is led into a mixture of 264 parts of tetrahydro naphthalene, 50 parts of anhydrous ferric chloride and 200 parts of petroleum ether (b. p. to 70° C.) at a temperature of 100 to 120° C. and under a pressure of about 25 atmospheres. Introducing is interrupted when an increase in weight of 90 parts is attained. After having removed the aluminum chloride and distilled off the solvent, distillation in vacuo yields 340 parts of an odorless transparent oil boiling from 150° to 200° C. at 20 mm. pressure.

*Example 5*

A mixture of 300 parts of α-chloro naphthalene, 10 parts of anhydrous aluminum chloride and 200 parts of decahydronaphthalene is stirred with ethylene at a temperature of 100 to 120° C. and under a pressure of from 25 to 30 atmospheres, until 100 parts of ethylene have been absorbed. After having removed the catalyst and distilled off the decahydronaphthalene, distillation in vacuo yields 150 parts of a light yellow oil boiling from 165 to 185° C. at 16 mm. pressure (mercury gauge) 160 parts of a yellow oil boiling from 185 to 210° C. at 16 mm. pressure (mercury gauge) and 50 parts of a deep green colored viscous oil boiling from 210 to 250° C. at 16 mm. pressure.

*Example 6*

An olefine containing gas of about 30 percent olefine content of which about 22 percent is ethylene and the remaining part consists of higher homologues of ethylene is caused to react upon a mixture of 256 parts of naphthalene, 7 to 8 parts of anhydrous aluminum chloride and 150 parts of decahydronaphthalene, at a temperature of about 50° C. and under a pressure of from 25 to 30 atmospheres in such manner that the gas is continuously forced into the pressure-tight vessel while the residual gas—free from, or poor in, olefines—continuously is allowed to escape. This operation is continued until an increase in weight of about 120 parts is attained. After removing the aluminum chloride and distilling off the decahydronaphthalene the mixture is found to consist of about 330 parts of oils being composed of the homologues of naphthalene boiling from 150 to 210° C. at 16 mm. pressure (mercury gauge), and 35 parts of unchanged naphthalene.

Example 7

400 parts of acenaphthene are suspended in 500 parts of decahydronaphthalene and mixed with 40 parts of anhydrous aluminum chloride. This mixture is stirred with ethylene at a temperature of 110 to 130° and under a pressure of from 30 to 40 atmospheres until an increase in weight of about 50 parts is attained. After removing the aluminum chloride distillation in vacuo is effected. Besides the unchanged decahydronaphthalene equal parts of an oily fraction boiling from 110 to 200° C. at 12 mm. pressure and of an oily fraction boiling from 200 to 290° at 12 mm. pressure are obtained. The residue consists of a light brown hard resin. The liquid fractions obtained are viscous oils of good lubricating properties.

Example 8

A mixture of 500 parts of phenanthrene, 50 parts of anhydrous aluminum chloride and 500 parts of decahydronaphthalene is stirred with propylene gas at a temperature of about 100° C. and under a pressure of 20 atmospheres. Within three hours 700 parts of propylene are absorbed. From the proportions given, it results that six mols of propylene are reacted upon one mol of phenanthrene. The reaction products are distilled at 1 mm. pressure (mercury gauge) (after having removed aluminum chloride and recovered decahydronaphthalene) and yield 11 percent of viscous oily first runnings while 87 percent of resinous distillates are obtained which according to the boiling range are from soft, hard to extremely hard nature.

Example 9

Ethylene is led into a mixture of 450 parts of anthracene, 330 parts of aluminum chloride and 500 parts of decahydronaphthalene at a temperature of 60° C. and a pressure of 20 to 25 atmospheres. Within 6 hours about 140 parts of ethylene are absorbed. From the proportions given, it results that two mols of ethylene are reacted upon one mol of anthracene. The reaction products are freed from aluminum chloride and distilled in vacuo. Besides the unchanged decahydronaphthalene, an oil boiling from 200 to 300° at 10 mm. pressure (mercury gauge) and solidifying to an ointment-like mass in the cold is obtained. The residue consists of a brown resinous body.

Example 10

356 parts of crude anthracene (43 percent) are suspended in 800 parts of decahydronaphthalene and mixed with 36 parts of anhydrous aluminum chloride. The mixture is heated at 120° C. and stirred with propylene gas at a pressure of 20 atmospheres for some 6 hours, in which time 1040 parts of propylene are absorbed. The working up of the reaction mixture by distillation in vacuo yields besides the unchanged decahydronaphthalene: about 20 percent of a fraction boiling from 90 to 120° C. at 12 mm. pressure, about 20 percent of a fraction boiling from 120 to 200° C. at 12 mm. pressure, about 40 percent of a fraction boiling from 200 to 250° C. at 12 mm. pressure, about 15 percent of a fraction boiling from 250 to 300° C. at 12 mm. pressure.

All the fractions are viscous oils of good lubricating properties; the higher boiling fractions have a high flash point.

In case smaller quantities of propylene should be combined with anthracene reaction may be effected at atmospheric pressure.

Example 11

350 parts of anthracene residues (obtained from the mother liquors of the refining of crude anthracene), 35 parts of aluminum chloride and 600 parts of decahydronaphthalene are mixed and stirred with propylene gas at a temperature of 100° C. and under atmospheric pressure. The action is interrupted after the lapse of one hour when an increase in weight of 190 parts is attained. The reaction product is freed from aluminum chloride and decahydronaphthalene and then distilled at a pressure of 1 mm. (mercury gauge) with the result that 22 percent of a viscous oil boiling from 90 to 200° (1 mm.) and 70 percent of a fraction boiling from 200 to 280° C. and solidifying to a clear light colored odorless resin are obtained.

In the following claims the generic term "polynuclear hydrocarbon compound" is used to denote—either singly or in admixture—polynuclear aromatic hydrocarbons and the oxygen-free derivatives thereof inasmuch as they contain at least one double linkage in a nucleus (an aromatic nucleus being considered as containing three double linkages) i. e. homologous, partially hydrogenated and/or halogenated polynuclear aromatic hydrocarbons.

I claim:

1. Process which comprises reacting with an olefine upon a polynuclear hydrocarbon compound in the presence of a catalytically acting metallic halide and of an inert solvent.

2. Process which comprises reacting with an olefine upon a polynuclear aromatic hydrocarbon in the presence of a catalytically acting metallic chloride and of an inert solvent.

3. Process which comprises reacting with an olefine upon a polynuclear aromatic hydrocarbon in the presence of a catalytically acting metallic chloride and of an inert solvent under superatmospheric pressure.

4. Process which comprises reacting with an olefine upon a polynuclear aromatic hydrocarbon having at least three nuclei in the presence of a catalytically acting metallic chloride and of an inert solvent under superatmospheric pressure.

5. Process which comprises reacting with an olefine upon a polynuclear aromatic hydrocarbon having at least three nuclei in the presence of a catalytically acting metallic chloride and a completely hydrogenated aromatic hydrocarbon under superatmospheric pressure.

6. Process which comprises reacting with an olefine upon anthracene in the presence of aluminum chloride and of decahydronaphthalene under superatmospheric pressure.

7. Process which comprises reacting with propylene upon anthracene in the presence of aluminum chloride and of decahydronaphthalene at a temperature of above 50° C.

In testimony whereof I have hereunto set my hand.

RICHARD MICHEL.